United States Patent [19]

Petersen

[11] 4,007,320

[45] Feb. 8, 1977

[54] PROCESS FOR REDUCING POLYMER BUILD-UP

[75] Inventor: Jorgen Petersen, Sundsvall, Sweden

[73] Assignee: Kemanord Aktiebolag, Stockholm, Sweden

[22] Filed: Apr. 29, 1975

[21] Appl. No.: 572,807

[30] Foreign Application Priority Data

May 21, 1974 Sweden .............................. 7406731
Dec. 16, 1974 Sweden .............................. 7415794

[52] U.S. Cl. ................................. 526/62; 23/285; 23/288 R; 526/74
[51] Int. Cl.² ........................................ C08F 2/16
[58] Field of Search ... 260/87.1, 89.5 AW, 92.8 W, 260/93.5 W; 23/285, 288 R; 526/62, 74

[56] References Cited
UNITED STATES PATENTS

| | | | |
|---|---|---|---|
| 3,515,709 | 6/1970 | Nelson et al. ................ | 260/92.8 W |
| 3,669,946 | 6/1972 | Koyanagi et al. ................ | 260/87.1 |
| 3,778,423 | 12/1973 | Reiter ........................... | 260/92.8 W |
| 3,804,924 | 4/1974 | Papetti et al. ............... | 260/93.5 W |
| 3,849,179 | 11/1974 | Morningstar ................ | 260/92.8 W |

FOREIGN PATENTS OR APPLICATIONS 2,357,869  5/1974  Germany ............................. 526/74

*Primary Examiner*—Alan Roller
*Attorney, Agent, or Firm*—Fred Philpitt

[57] ABSTRACT

The present invention relates to a process for reducing the build-up of polymer on the internal surfaces of a polymerization vessel. This is accomplished according to the invention by coating the internal surfaces of the polymerization vessel with a polymeric material and insolubilizing said material by cross-linking.

9 Claims, No Drawings

PROCESS FOR REDUCING POLYMER BUILD-UP

Ethylenically unsaturated polymerizable compounds are polymerized in aqueous dispersion according to two general principles, viz. emulsion polymerization and suspension polymerization. When e.g. vinyl chloride is emulsion polymerized the monomer is dispersed in water by means of an emulsifying agent. The actual polymerization reaction occurs by utilization of water soluble initiators in micelles which are formed from the emulsifying agent in the aqueous phase. In a suspension polymerization process the monomer is dispersed in the aqueous phase by means of a protective colloid of organic and/or inorganic character in such a way that droplets of monomer are formed in the aqueous phase. These droplets are prevented from agglomeration by the protective colloid. The size of the droplets can be regulated by addition of an emulsifying agent. Monomer soluble free radical initiators are used in the process.

Polymerization of ethylenically unsaturated compounds in water-based systems generally produces a more or less pronounced deposit or build-up of solid polymer on those parts of the polymerization vessel which are in contact with the reaction mixture or gaseous monomer. This build-up is presumably due to the fact that the inner surfaces of the polymerization vessel absorb monomers which thereafter are polymerized. Frequently these deposits scale off partly from the walls of the polymerization vessel and the produced polymerizate will contain flakes of a harder polymer.

Many factors affect the polymer build-up and the most important ones are: type of monomer which is polymerized, heating rate and cooling capacity of the polymerization vessel, agitating conditions, choice of initiator or initiator combination and the appearance of the surfaces of the polymerization vessel. Production of polymer build-up is less likely on smooth surfaces than on scratched surfaces.

Because of this tendency to polymer build-up severe problems do often arise during polymerization of ethylenically unsaturated polymerizable compounds in aqueous dispersion, and especially during homo- or copolymerization of vinyl chloride. It is necessary to remove the deposits from the walls of the polymerization vessel in order to effectively carry out the cooling of the reaction mixture. When removing the deposits there is often a risk of scratching the walls which by itself causes increased polymer build-up during subsequent polymerization reactions. The cleaning is time consuming and thus causes interruption of the production and the utilization degree of the reactors is decreased. It has also lately been established that this cleaning operation can cause health hazards for the operators and for that reason very extensive measures of precaution must be taken at the removal of the deposits.

Many efforts have been made in order to reduce this polymer build-up on the internal surfaces of a reaction vessel. Numerous different compounds have been suggested as additives to the polymerization system and lately it has also been suggested to coat the internal surfaces of the polymerization vessel with a polymer film. The application of such films has hitherto involved many difficulties. The polymerization vessels can be very large, e.g. more than 100 m³, and the application of the film must be carried out rapidly and preferably in one step in order not to block the vessel for an unduly long time. The film must not too easily be dissolved by the polymerization medium as this would imply that the coating must be repeated for each polymerization process. The film must show good adhesion to the internal walls of the reactor and the polymer must be insolubilized in a very short time after the application as it otherwise would flow off the walls and thus not give any build-up reducing effect.

According to the present invention it has been found that polymeric films on the internal surfaces of a polymerization vessel readily can be formed by coating major parts of the surfaces with a polymeric material containing hydroxy groups and insolubilizing said polymeric material by cross-linking with an organic titanate.

One of the advantages by using an organic titanate as crosslinking agent for the polymeric material is that insolubilization occurs very rapidly, and thus permits an application technique which easily can be used in large vessels without flowing of the polymer before it is insolubilized. The application can be done in a one step procedure and in a very short time. There is no need for expensive solvents as the polymer can be applied as a water solution. Another advantage is that the crosslinking effect of many of the organic titanates starts at temperatures above about 50° C whereby the mixture of the polymer and the titanate can be applied cold with no risk of gelation or viscosity changes in the application equipment. A further advantage is that the insolubilized films obtained are very resistant to the polymerization medium and therefore several polymerizations can be conducted in the vessel before a new coating must be applied. It is also supposed that the titanate has an adhesive promoting effect on the surfaces of the vessel which imparts the adhesion of the polymer to the surface. Still an advantage is that the organic titanates themselves, or their decomposition products, have a build-up inhibiting effect which further reduces polymer build up in polymerization vessels treated according to the invention.

The present invention therefore relates to a process for reducing the build-up of polymer on the internal surfaces of a reaction vessel for polymerization of ethylenically unsaturated polymerizable compounds in aqueous dispersion which comprises the steps of coating major parts of said surfaces with a polymeric material containing hydroxy groups and insolubilizing said polymeric material by crosslinking with an organic titanate.

The polymeric material containing hydroxy groups used according to the invention can be natural or semi-synthetic, such as starch and starch derivatives, gelatin, carboxy methylcellulose, hydroxyalkyl cellulose etc. or synthetic, such as polyvinyl alcohol. The preferred polymers are starch and its derivatives and polyvinyl alcohol. As examples of starch and starch derivatives can be mentioned potato starch, maize starch, wheat starch, tapioca starch, nonionic, anionic or cationic starch derivatives, such as starch containing phosphate, ester, ether, carboxy methyl, aldehyde, tertiary amine or quaternary amine groups.

Any suitable water soluble polyvinyl alcohol can be used to produce the coating according to the invention, e.g. such which has a relative viscosity of 4 to 140 cP, measured according to Hoeppler in a 4% water solution at 20° C. The degree of hydrolysis should be within the range of 80 to 100%. Polyvinyl alcohol having a viscosity exceeding 50 cP, measured according to the above mentioned method, and a degree of hydrolysis of 90 to 100% is suitably used.

The organic titanate used as cross-linking agent for insolubilizing the polymeric material is an alkyl, aryl, acyl titanate or a titanium chelate. If the polymeric material is applied to the surface of the vessel in the form of a water solution the organic titanates should have a relatively low hydrolysis rate and for this purpose titanium chelates are preferred. The titanium chelates are known as alkyl titanates containing electron-donating atoms such as nitrogen and oxygen, such as alkanolamines, β-ketonic esters, diketones, α-hydroxycarboxylic acids, glycols and dicarboxylic acids.

The amount of organic titanate used as cross-linking agent should be 5 to 100 percent by weight, based on the weight of the polymeric material, and preferably 10 to 50 percent by weight.

Any polymerization vessel for the polymerization of ethylenically unsaturated compounds can be provided with the coating according to the invention. Thus the material of the walls of the vessel in contact with the reaction mixture can be of any kind, e.g. glass, enamel or metal. The most serious problems of polymer build-up usually occur in steel-reactors, and thus it is particularly suitable to provide these with the present coating. The reactions can in a known manner be equipped with agitators, flow regulators, pockets for temperature regulators, cooling coils, reflux condensers etc., which also suitably are coated according to the invention.

According to the invention the expression insolubilized polymer or polymeric material should be understood to be a polymer which has been cross-linked by the organic titanate to such a degree that the polymer deposited on the internal surfaces of the vessel will not be dissolved by the polymerization medium during at least 50% of the polymerization time. Preferably the polymer is insolubilized to such a degree that it resists several polymerizations.

The coating of the internal surfaces of the polymerization vessel with the polymer can be accomplished in any suitable way, e.g. by spraying or painting a solution of the polymer onto the surfaces. The polymer may be dissolved in an organic solvent or in water. The organic titanate can be applied in the same manner before or after the application of the polymer or the titanate can be added to the solution of polymer and thus applied to the surface together with the polymer.

The cross-linking of the polymer occurs by heating of the polymer in the presence of the titanate. Depending on the type of titanate a warm solution of the polymer and of the titanate can e.g. be sprayed or painted onto the surface or a cold solution can be applied to a warm surface or the surface can be warmed after the application of the polymer and titanate. The cross-linking temperature varies with the type of organic titanate but is normally within the interval from 50° to 100° C.

In order to obtain a thin and even coating the viscosity of the polymer solution is regulated to suit the application technique, e.g. by regulating the amount of polymer in the solution or by addition of thickeners.

According to a preferred embodiment the polymer, e.g. polyvinyl alcohol or starch, is dissolved in water to a concentration within the range of 0.2 to 5 percent by weight. To this solution the organic titanate is added, e.g. titanium acetylacetonate, triethanol amine titanate or titanium lactate, in an amount of 5 to 100 percent by weight based on the polymer. This cold solution is then sprayed as an even coating onto major parts of the internal surfaces of a polymerization vessel by means of suitable spraying equipment.

The viscosity of the solution to be sprayed is adjusted by regulation of the amount of polymer and organic titanate. At too high concentrations of the solution gel lumps are formed on the walls of the vessel and at too low concentration the coating flows off the walls before the cross-linking occurs. The suitable viscosity can easily be determined by a simple test. The polymer is cross-linked almost instantaneously if the temperature of the walls is within the range of 50° to 100° C. The mixture can also be applied to a cold wall and thereafter be insolubilized by heating of the wall.

The thickness of the coating can be varied within wide intervals. The thickness should suitably exceed 0.2 $\mu$m while the upper limit is not critical but is decided from economical reasons and depends on the application technique. The insolubilized polymer suitably consists of a film having a thickness within the range of 0.5 to 100 $\mu$m, preferably 1 to 30 $\mu$m. For practical purposes the amount of polymer can be calculated on the amount of monomer to be polymerized and should be 1-2000 ppm, preferably 5-100 ppm of this.

Depending on the thickness of the coating and the type of organic titanate as cross-linking agent the insolubilized polymer can resist several polymerizations in the vessel without being damaged. It can however be suitable to repeat the coating procedure after each polymerization in the vessel in order to obtain the best possible build-up reducing effect. This effect is only obtained on surfaces which show the polymer coating and preferably all surfaces in contact with the polymerization medium should be coated, it is however also within the scope of the invention that at least smaller parts of the surfaces may be un-coated.

The insolubilized polymer film may also contain additives, such as antifoaming agents, antioxidants, wetting agents or compounds having known build-up reducing effect, e.g. inorganic iron salts, methylene blue, α-methyl styrene acetophenone, cumylphenol, bisphenol A etc.

The build-up reducing effect of the insolubilized polymer appears during polymerization of ethylenically unsaturated polymerizable compounds alone or in admixture with each other in aqueous dispersion. As examples of suitable monomers can be mentioned: vinyl aromatic compounds, e.g. styrene, p-chloro styrene, esters of aliphatic alpha methylene carbonic acids, preferably low alkyl esters, e.g. methyl acrylate, ethyl acrylate, methyl methacrylate, ethyl methacrylate, acrylic acid nitrile, vinyl esters, e.g. vinyl acetate, vinyl halides, e.g. vinyl chloride, vinyl ethers, e.g. vinyl methyl ether, vinylidene chloride or low alkenes, e.g. butadiene. The monomer is preferably styrene or vinyl chloride or a mixture of styrene or vinyl chloride and at least one other ethylenically unsaturated copolymerizable monomer, e.g. any of the above mentioned, in an amount up to 20 percent by weight, based on the styrene or the vinyl chloride.

The present invention thus also comprises a method for polymerization of ethylenically unsaturated polymerizable compounds in aqueous dispersion, where the polymerization is carried out in a polymerization vessel where major parts of the internal surfaces of said vessel have been coated with a polymeric material containing hydroxy groups which has been insolubilized by cross-linking with an organic titanate.

Also included in the invention is a polymerization vessel having major parts of its internal surfaces coated with a polymeric material cross-linked with an organic titanate.

The invention is described more in detail in the following examples which, however, are not intended to limit the same. In the examples percent and parts relate to percent by weight and parts by weight respectively unless otherwise stated.

EXAMPLE 1

The test was carried out in a bottle polymerization device and the volume of the bottles was 1 liter. A solution of polyvinyl alcohol containing 100 parts of water, 2 parts of polyvinyl alcohol having a degree of hydrolysis of 99 % and a relative viscosity of 60 cP according to Hoeppler was prepared. 0.3 parts of triethanolamine titanate were added to this solution.

The above prepared solution was brushed onto the inside of 2 steel bottles to a thickness of 5 $\mu$m, i.e. about 15 g of polyvinyl alcohol per bottle, whereafter the bottles were heated to 70° C for cross-linking of the polyvinyl alcohol.

In these bottles a polymerization mixture was charged consisting of 100 parts of vinyl chloride, 127 parts of water, 0.2 parts of polyvinyl alcohol (degree of hydrolysis 88 %, relative viscosity 40 cp according to Hoeppler) as a suspension stabilizer and 0.09 parts of dicetylperoxy dicarbonate as an initiator. The bottles were placed in a water bath and rotated for 18 hours (42 rpm) at 50° C. After that the bottles were cooled and unreacted vinyl chloride degassed. Two bottles which had not been treated with polyvinyl alcohol were used as reference and polymerization was carried out according to the same procedure.

After removal of the obtained polymerizate the inner surfaces of the bottles were inspected and the surfaces of the bottles having a coating according to the invention were completely free from deposits while those bottles which were used as reference had a surface coated with a thin film of polyvinyl chloride.

EXAMPLE 2

Two steel bottles with the inner surfaces coated with insolubilized polyvinyl alcohol in the same way as described in example 1 and two reference bottles without coating were used for polymerization of styrene according to the following recipe: 100 parts of styrene, 400 parts of water, 1.5 parts of an inorganic protective colloid of silica type and 1.2 parts of benzoyl peroxide.

Polymerization was carried out for 18 hours at 80° C while rotating the bottles (42 rmp), the bottles then being cooled and the obtained polymerizate removed.

The two bottles which had been coated with insolubilized polyvinyl alcohol showed a surface completely free from deposits while the two references showed surfaces with a coating, similar to abrasive paper, of polystyrene.

EXAMPLE 3

The same reaction mixture as in example 2 was charged to an untreated steel bottle and in addition a polyvinyl alcohol solution according to example 1 was charged to the obtained water suspension so that 15 g of polyvinyl alcohol were present in the reaction mixture, i.e. the amount of polyvinyl alcohol which had been insolubilized in the bottles according to the examples 1 and 2. After polymerization of this mixture the bottle was covered by the same, to abrasive paper similar, coating of polystyrene which was obtained in example 2.

This test shows that it is essential that the reactor is coated with insolubilized polyvinyl alcohol at the start of the polymerization and that the build-up reducing effect is not obtained by the amount dissolved polyvinyl alcohol in the reaction mixture.

EXAMPLE 4

This test was carried out in a bottle polymerization device and the volume of the bottles was 1 liter. A starch solution containing 100 parts of water and 2 parts of starch was prepared. The starch was a phosphate ester of potato starch and had a high viscosity (1000 cP at 25° C and a solids content of 15 % measured with a Brookfield viscometer, spindle 2, at 20 rpm). To this solution 1.0 parts of triethanolamine titanate was added.

The above prepared solution was brushed onto the inside of two steel bottles to a thickness of 5 $\mu$m, i.e. 15 g of starch solution per bottle, whereafter the bottles were heated to 80° C for crosslinking of the starch.

In these bottles a polymerization mixture was charged consisting of 100 parts of vinyl chloride, 127 parts of water, 0.1 parts of polyvinyl alcohol (degree of hydrolysis 88 %, relative viscosity 40 cP according to Hoeppler) as a suspension stabilizer and 0.09 parts of dicetylperoxy dicarbonate as initiator. The bottles were placed in a water bath and rotated for 18 hours (42 rpm) at 50° C. After that the bottles were cooled and unreacted vinyl chloride was degassed. Two bottles which had not been treated with starch and two bottles containing 15 g of starch solution without added crosslinking agent were used as reference and polymerization was carried out in these according to the same procedure.

After removal of the obtained polymerizate the inner surfaces of the bottles were inspected and the surfaces of the bottles which had a coating according to the invention were completely free from deposits while the four bottles which were used as references had a surface coated with a thin film of polyvinyl chloride.

EXAMPLE 5

A 2 % starch solution was prepared from a cold water soluble potato starch normally used in food. The viscosity of the solution at 20° C was about 40 cP measured with a Brookfield viscometer at 50 rpm. To the solution was added 1.0 part of titanyl acetylacetonate. The test was carried out according to the procedure of example 4. 2 bottles were treated, 2 were untreated and 2 bottles were untreated but 14 ml of 2 % starch solution without cross-linking agent had been added, i.e. the same amount as used for treatment of the surfaces.

After the test the surfaces of the treated bottles were free from deposits while the walls of the four other bottles were coated with a film of polyvinyl chloride.

EXAMPLE 6

Two steel bottles having the internal surfaces coated with insolubilized starch in the same way as has been described in example 4 and four reference bottles; two without a coating and two with addition of 15 ml of starch solution but without crosslinking agent, were used for polymerization of styrene according to the following recipe: 100 parts of styrene, 400 parts of water, 1.5 parts of an inorganic protective colloid and 1.2 parts of benzoyl peroxide.

Polymerization was carried out for 18 hours at 80° C while rotating the bottles (42 rpm). The bottles were then cooled and the obtained polymerizate removed.

The two bottles which had been coated with insolubilized starch showed a surface completely free from deposits while the four references showed surfaces with a coating, similar to abrasive paper, of polystyrene.

EXAMPLE 7

This test was carried out in a similar manner as in example 6 but methyl methacrylate (MMA) was used as monomer. Polymerization recipe: 100 parts of MMA, 400 parts of water, 1.5 parts of polyvinyl alcohol (degree of hydrolysis 99 %, relative viscosity 60 cP according to Hoeppler) and 1.2 parts of benzoyl peroxide. Polymerization was carried out for 18 hours at 80° C. The two bottles which had been coated with insolubilized starch showed a surface completely free from deposits while the four references showed surfaces with a coating, similar to abrasive paper, of polymethyl methacrylate.

EXAMPLE 8

Two bottles were treated with the starch solution of example 4, containing 0.6 g of an antioxidant and two bottles were untreated reference bottles. To the bottles were added components for emulsion polymerization according to the following recipe: 100 parts of vinyl chloride, 225 parts of water, 0.4 parts of potassium persulphate and 0.8 parts of ammonium laurate. Polymerization time was 5 hours at 50° C.

The treated bottles showed a clean surface without deposits after completed polymerization while the reference bottles had a film of polyvinyl chloride.

EXAMPLE 9

Two tests were carried out in a 14 l autoclave equipped with anchor agitator: In test 1 60 ml of the starch solution according to example 4 was brushed on to the wall of the autoclave at 80° C and a film thickness of 3-4 $\mu$ m was obtained. 7000 ml of water, 400 ml of a 1-% polyvinyl alcohol (degree of hydrolysis 88 %) and 3 g of dicetylperoxy dicarbonate were added to the autoclave under agitation. After evacuation of air 4.5 liters of vinyl chloride were charged and polymerization was carried out at 55° C until the pressure dropped. After degassing of residual monomer and discharging of the polymerization vessel the walls of the autoclave were inspected: in test 1 there were no deposits or coatings on the walls of the autoclave while in test 2 which was carried out in the same manner but with the difference that the wall of the autoclave had not been coated with a starch film the wall of the autoclave was coated to 90 % with a film of polyvinyl chloride.

EXAMPLE 10

Two steel bottles with the inner surfaces coated by insolubilized polyvinyl alcohol in the same way as described in example 1 and two reference bottles without coating were used for copolymerization of vinyl chloride and vinyl acetate according to the following recipe: 100 parts of vinyl chloride, 20 parts of vinyl acetate, 250 parts of water, 0.2 parts of sodiumacetate, 0.1 parts of acetic acid, 0.3 parts of lauroylperoxide and 0.45 parts of methylcellulose. The polymerization was carried out at 60° C for 6 hours.

The two coated bottles showed a clean surface free from deposits while the surfaces of the reference bottles were coated by a film of polyvinyl chloride and deposits.

EXAMPLE 11

Tests were carried out in a reactor of 21 cubic meters. The walls were sprayed with 10 l of a polyvinyl alcohol solution containing 2 parts of polyvinyl alcohol, having a degree of hydrolysis of 90 % and a relative viscosity of 60 cP, and 0.4 parts of a triethanolamine titanate. The temperature of the walls was 80° C.

The reactor was then charged according to the following recipe: 100 parts of vinyl chloride, 130 parts of water, 0.05 parts of sorbitan monolaurate, 0.10 parts of lauric acid, 0.10 parts of ammonia, 0.03 parts of methyl cellulose, and 0.08 parts of peroxy initiator. The polymerization temperature was 58° C.

The walls of the reactor were free from deposits and polyvinyl chloride film after completed polymerization.

Corresponding tests in the same reactor but without treatment of the walls resulted in coating of the walls by a film of polyvinyl chloride and scale-deposits.

I claim:

1. A process for reducing the build-up of polymer on the internal surfaces of a reaction vessel for polymerization of ethylenically unsaturated polymerizable compounds in aqueous dispersion which comprises the steps of
   a. coating major parts of said surfaces with a polymeric material containing hydroxy groups, and
   b. insolubilizing said polymeric material by cross-linking with an organic titanate.
2. A process according to claim 1, characterized in that the polymeric material is polyvinyl alcohol.
3. A process according to claim 1, characterized in that the polymeric material is starch.
4. A process according to claim 1, characterized in that the organic titanate is a titanium chelate.
5. A process for the polymerization of vinyl chloride or styrene or a mixture of vinyl chloride or styrene and at least one other unsaturated copolymerizable compound in an amount of up to 20 percent by weight based on the amount of vinyl chloride or styrene, wherein the polymerization is conducted in a polymerization vessel where major parts of the internal surfaces have been coated with a polymeric material containing hydroxy groups which has been insolubilized by cross-linking with an organic titanate.
6. A process according to claim 5, characterized in that the polymeric material is polyvinyl alcohol.
7. A process according to claim 5, characterized in that the polymeric material is starch.
8. A process according to claim 5, characterized in that the organic titanate is a titanium chelate.
9. A polymerization reaction vessel having on major parts of its internal surfaces a coating of a polymeric material containing hydroxy groups insolubilized by cross-linking with an organic titanate, whereby polymer build-up is substantially reduced.

* * * * *